(12) United States Patent
Kohler (10) Patent No.: US 12,447,306 B2
(45) Date of Patent: Oct. 21, 2025

(54) CATHETER VALVE DEVICES AND METHODS

(71) Applicant: Mayo Foundation for Medical Education and Research, Rochester, MN (US)

(72) Inventor: Tobias S. Kohler, Rochester, MN (US)

(73) Assignee: Mayo Foundation for Medical Education and Research, Rochester, MN (US)

( * ) Notice: Subject to any disclaimer, the term of this patent is extended or adjusted under 35 U.S.C. 154(b) by 422 days.

(21) Appl. No.: 18/084,861

(22) Filed: Dec. 20, 2022

(65) Prior Publication Data

US 2023/0191080 A1    Jun. 22, 2023

Related U.S. Application Data

(60) Provisional application No. 63/291,787, filed on Dec. 20, 2021.

(51) Int. Cl.
*A61M 25/00*    (2006.01)

(52) U.S. Cl.
CPC .... *A61M 25/0017* (2013.01); *A61M 25/0075* (2013.01)

(58) Field of Classification Search
CPC .......... A61M 39/24; A61M 2039/2406; A61M 2039/242; A61M 2039/2433; A61M 2039/244; A61M 2039/2446; A61M 2039/2453; A61M 2039/246; A61M 2039/2466; A61M 2039/2473; A61M 2039/248; A61M 2039/2486; A61M 2039/2493; A61M 25/0017; A61M 25/0075; A61M 27/00; A61M 2025/0078; A61B 5/20; A61B 5/202; A61B 5/204; A61B 5/205; A61B 5/207; A61B 5/208; A61B 5/227; A61B 2505/07; A61B 2505/09; A61B 2562/0247; A61B 5/036; A61B 5/6852; F16K 17/06; F16K 17/065

See application file for complete search history.

(56) References Cited

U.S. PATENT DOCUMENTS

| | | | | |
|---|---|---|---|---|
| 4,306,705 | A * | 12/1981 | Svensson | A61F 5/4405 604/905 |
| 4,421,510 | A * | 12/1983 | Ahlbeck | A61F 5/4404 137/859 |
| 2002/0143318 | A1* | 10/2002 | Flinchbaugh | A61M 5/16881 604/179 |
| 2008/0172006 | A1* | 7/2008 | Hicks | A61M 39/24 604/249 |
| 2009/0204078 | A1* | 8/2009 | Mitchell | A61M 39/223 604/246 |
| 2015/0018780 | A1* | 1/2015 | Butterfield | A61M 39/24 604/246 |
| 2015/0112312 | A1* | 4/2015 | Mooney | A61M 25/10182 604/544 |
| 2018/0280682 | A1* | 10/2018 | Thomas | F16K 15/1848 |
| 2019/0009016 | A1* | 1/2019 | Doll | A61M 39/24 |
| 2019/0091461 | A1* | 3/2019 | Bonham | A61M 25/0014 |

(Continued)

*Primary Examiner* — Adam Marcetich
(74) *Attorney, Agent, or Firm* — Fish & Richardson P.C.

(57) ABSTRACT

Devices and methods are described for urinary catheters and catheter valves. For example, this disclosure relates to urinary catheters having valves that facilitate testing of a user's ability to urinate.

7 Claims, 4 Drawing Sheets

(56) References Cited

U.S. PATENT DOCUMENTS

| | | | |
|---|---|---|---|
| 2020/0179674 A1* | 6/2020 | Moss | A61M 1/28 |
| 2020/0384257 A1* | 12/2020 | Koh | A61M 39/105 |
| 2020/0397532 A1* | 12/2020 | Bushman | A61C 17/08 |
| 2021/0000361 A1* | 1/2021 | Lark | A61B 5/208 |
| 2021/0106413 A1* | 4/2021 | Thomas | A61C 17/065 |
| 2021/0388911 A1* | 12/2021 | Caya | F16K 17/06 |
| 2022/0241558 A1* | 8/2022 | O'Brien | A61M 27/00 |
| 2022/0249805 A1* | 8/2022 | Pedersen | A61B 5/205 |
| 2022/0347430 A1* | 11/2022 | Pedersen | A61M 25/0097 |

* cited by examiner

CATHETER VALVE DEVICES AND METHODS

CROSS-REFERENCE TO RELATED APPLICATIONS

This application claims the benefit of U.S. Provisional Application Ser. No. 63/291,787, filed Dec. 20, 2021. The disclosure of the prior application is considered part of (and is incorporated by reference in) the disclosure of this application.

BACKGROUND

1. Technical Field

This disclosure relates to systems, devices and methods for urinary catheters and catheter valves. For example, this disclosure relates to urinary catheters having valves that facilitate testing of a user's ability to urinate.

2. Background Information

Urinary catheters and methods of using urinary catheters can be used to drain the bladder of a patient that is otherwise unable to urinate properly. A patient's ability to urinate properly is tested during voiding trials where the patient's ability to urinate with a catheter removed can be tested. Voiding trials apply in several situations including for a patient that goes into urinary retention requiring a catheter secondary to prostate enlargement and/or other inciting event (constipation, general anesthesia, medications etc.). For example, voiding trials can test a patient that undergoes prostate surgery to treat prostate blockage and undergoes testing to see if the surgical intervention allows patient to void properly. Voiding trials can be used to test a patient that undergoes a non-prostate related procedure (kidney stone, bladder cancer treatment) where a catheter is left in place while the patient is on pain medications that may decrease the patient's ability to void.

In some instances, voiding trials can include a patient that has several ounces of normal saline instilled into the bladder through the catheter until the patient feels "full." The catheter is then removed and the patient attempts to empty their bladder. In some cases, patients will spend hours at the clinic to assess their ability to urinate adequately. If they cannot void adequately (e.g., zero output or leaving some instilled ounces behind), the catheter is replaced which increases materials cost, is inconvenient, is painful and carries infection risk. Accordingly, there is a need to improve the voiding trial approach and decrease the number of patients with "failed" voiding trials.

Urodynamics (UDS) are a type of test that measures bladder pressures through the use of small catheters placed at the time of testing. Standard UDS testing cannot make use of existing indwelling catheters (from a recent retention episode) to assess for bladder function. A device exists that measures bladder pressure which interprets patient attempts to void and senses pressure changes in catheter balloon that retains the proximal end of the catheter within the bladder of the patient. However, this device cannot be used by the patient at home and does not obtain repeated pressures, nor does it establish a dynamic relationship of volume voided to volume remaining in bladder.

SUMMARY

This disclosure describes systems, devices and methods for urinary catheters and catheter valves. For example, this disclosure describes urinary catheters having valves that facilitate testing of a user's ability to urinate.

An aspect of this disclosure includes a urinary catheter system that includes a catheter tube having a proximal insertion end and a distal end, the catheter tube having a lumen extending from the proximal insertion end to the distal end for draining urine from a human bladder, and at least one drainage opening extending through the catheter tube to the lumen at or near the proximal insertion end; a valve connected to the distal end of the catheter tube, the valve may include: a valve gate configured to regulate fluid communication through a valve lumen; an arm positioned distally from the valve gate, the arm configured to extend into the valve lumen and contact a distal face of the valve gate to prevent the valve gate from actuating distally into an open position, and the arm configured to be removed from the valve lumen to release the valve gate to actuate distally into the open position; a spring connected to the valve gate, the spring configured to apply a threshold pressure against the valve gate to keep the valve gate in a closed position when the arm is removed from the valve lumen, where a fluid pressure above the threshold pressure against the valve gate is configured to overcome the threshold pressure and actuate the valve gate into the open position; and a lever connected to the valve gate configured to manually pull the valve gate into the open position when the arm is removed from the valve lumen.

Implementations may include one or more of the following features. The urinary catheter system where the valve is in a test position when the arm is removed from the valve lumen, the test position allows a user to test their ability to generate a bladder pressure to overcome the threshold pressure and open the valve gate. The threshold pressure is 30 cm of water water column (pressure).

One general aspect includes a urinary catheter valve that includes a valve gate configured to regulate fluid communication through a valve lumen. The valve also includes an arm positioned distally from the valve gate, the arm configured to extend into the valve lumen and contact a distal face of the valve gate to prevent the valve gate from actuating distally into an open position, and the arm configured to be removed from the valve lumen to release the valve gate to actuate distally into the open position. The valve also includes a spring connected to the valve gate, the spring configured to apply a threshold pressure against the valve gate to keep the valve gate in a closed position when the arm is removed from the valve lumen, where a fluid pressure above the threshold pressure against the valve gate is configured to overcome the threshold pressure and actuate the valve gate into the open position. The valve also includes a lever connected to the valve gate configured to manually pull the valve gate into the open position when the arm is removed from the valve lumen.

Implementations may include one or more of the following features. The urinary catheter system where the valve is in a test position when the arm is removed from the valve lumen, the test position allows a user to test their ability to generate a bladder pressure to overcome the threshold pressure and open the valve gate. The threshold pressure is 30 cm of water column force.

One general aspect includes a three-way valve medical device. The three-way valve medical device includes a main body configured to couple with a urinary catheter, the main body defining a fluid flow path; and a valve member movably coupled to the main body and operable in: (i) a closed mode in which the fluid flow path is blocked by the valve member, (ii) an open mode in which the fluid flow path is unblocked by the valve member, and (iii) a test mode in which the fluid flow path is blocked by the valve member until a threshold fluid pressure is applied to the valve member.

One general aspect includes a method for testing a user's ability to urinate inserting a urinary catheter system into a user, the urinary catheter system having a urinary catheter valve, the urinary catheter valve may include: a valve gate configured to regulate fluid communication through a valve lumen; an arm positioned distally from the valve gate, the arm configured to extend into the valve lumen and contact a distal face of the valve gate to prevent the valve gate from actuating distally into an open position, and the arm configured to be removed from the valve lumen to release the valve gate to actuate distally into the open position; a spring connected to the valve gate, the spring configured to apply a threshold pressure against the valve gate to keep the valve gate in a closed position when the arm is removed from the valve lumen; and a lever connected to the valve gate configured to manually pull the valve gate into the open position when the arm is removed from the valve lumen. The method also includes removing the arm from the valve lumen. The method also includes generating a fluid pressure against a proximal face of the valve gate. The method also includes opening the valve gate to allow fluid communication through the valve lumen when the fluid pressure is above the threshold pressure. The method also includes closing the valve gate to prevent fluid communication through the valve lumen when the fluid pressure is below the threshold pressure.

Particular embodiments of the subject matter described in this document can be implemented to realize one or more of the following advantages. Rather than the patient having fluid instilled and the catheter simply removed where there is a possibility a catheter needs to be replaced, the systems, devices, and methods described herein minimize the number of failed voiding trials by easily and safely assessing bladder function through patient home use of the urinary catheter valves described herein. The urinary catheter valves described herein ensure that a patient is capable of generating a minimum bladder pressure before the catheter is removed.

Unless otherwise defined, all technical and scientific terms used herein have the same meaning as commonly understood by one of ordinary skill in the art to which this invention pertains. Although methods and materials similar or equivalent to those described herein can be used to practice the invention, suitable methods and materials are described herein. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments of the invention are set forth in the accompanying drawings and the description herein. Other features, objects, and advantages of the invention will be apparent from the description and drawings, and from the claims.

DESCRIPTION OF THE DRAWINGS

Like reference numbers represent corresponding parts throughout.

DETAILED DESCRIPTION

This disclosure describes systems, devices and methods for urinary catheters and catheter valves. For example, this disclosure describes urinary catheters having valves that facilitate testing of a user's ability to urinate.

Embodiments of this disclosure include a urinary catheter system that includes a catheter tube having a proximal insertion end and a distal end. The catheter tube defines a lumen that extends from the proximal insertion end to the distal end for draining urine from a human bladder. The catheter tube has at least one drainage opening extending through the catheter tube to the lumen at or near the proximal insertion end.

Figure 1:
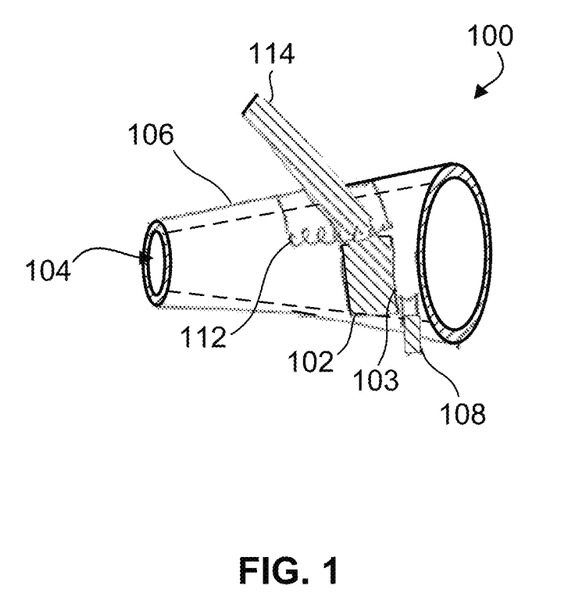
FIG. 1 is a side view of an example urinary catheter valve in a closed position in accordance with some embodiments.

Referring to FIG. 1, a valve 100 is shown that can be connected to the distal end of the catheter tube. As described further below, valve 100 has three positions that include a closed position, a test position, and an open position. FIG. 1 illustrates the valve 100 in the closed position. In the closed position, the valve 100 can be placed into the end of a standard catheter (or attached to an end of a standard catheter) to function as an openable/closeable plug.

The valve 100 includes a valve gate 102 configured to regulate fluid communication through a valve lumen 104 defined by a valve body 106. The valve 100 includes an arm 108 positioned distally from the valve gate 102, the arm 108 is configured to extend into the valve lumen 104 and to contact a distal face 103 of the valve gate 102 to prevent the valve gate 102 from actuating distally into an open position. The arm 108 is configured to be removable from the valve lumen 104. For example, the arm 108 may be manually slid into and out of the valve lumen 104. When the arm 108 is removed from the valve lumen 104, the valve gate 102 is released and is freed to be actuated into the open position (see FIGS. 2 and 3).

Figure 2:
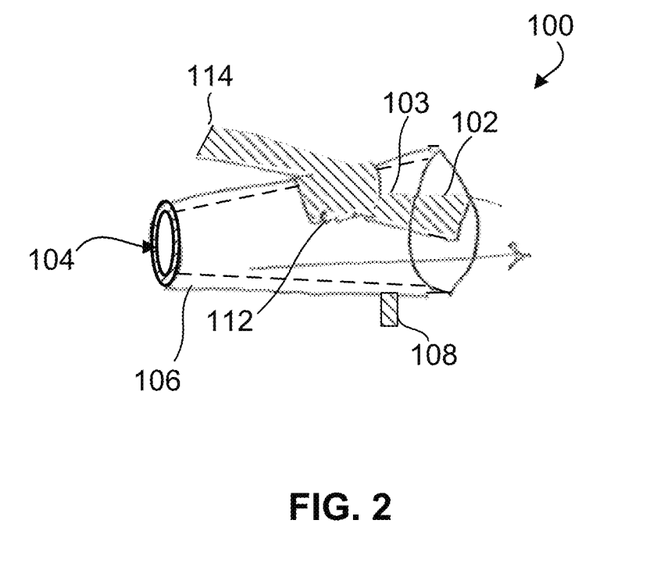
FIG. 2 is a side view of an example urinary catheter valve in an open position in accordance with some embodiments.

Valve 100 includes a spring 112 connected to the valve gate 102. The spring 112 is configured to apply a threshold pressure against the valve gate 102 to keep the valve gate 102 in a closed position when the arm 108 is removed from the valve lumen 104 (as shown in FIG. 2). The valve gate 102 and the spring 112 are configured to allow the valve gate 102 to move into the open position (as shown in FIG. 2) when a fluid pressure above the threshold pressure is applied within the lumen 104 against the valve gate 102. Valve 100 also includes a lever 114 connected to the valve gate 102. The lever 114 is configured to be manually manipulated to move the valve gate 102 into the open position when the arm 108 is removed from the valve lumen 104.

Referring to FIG. 2, the open position or configuration of the valve 100 is illustrated. In the open position, the arm 108 is removed from the valve lumen 104 to release the valve gate 102 to be moved into the open position. Then, the lever 114 is manually actuated by a user to move the valve gate 102 into the open position while the arm 108 is removed from the valve lumen 104. This open position of the valve gate 102 allows flow through the lumen 104.

Figure 3:
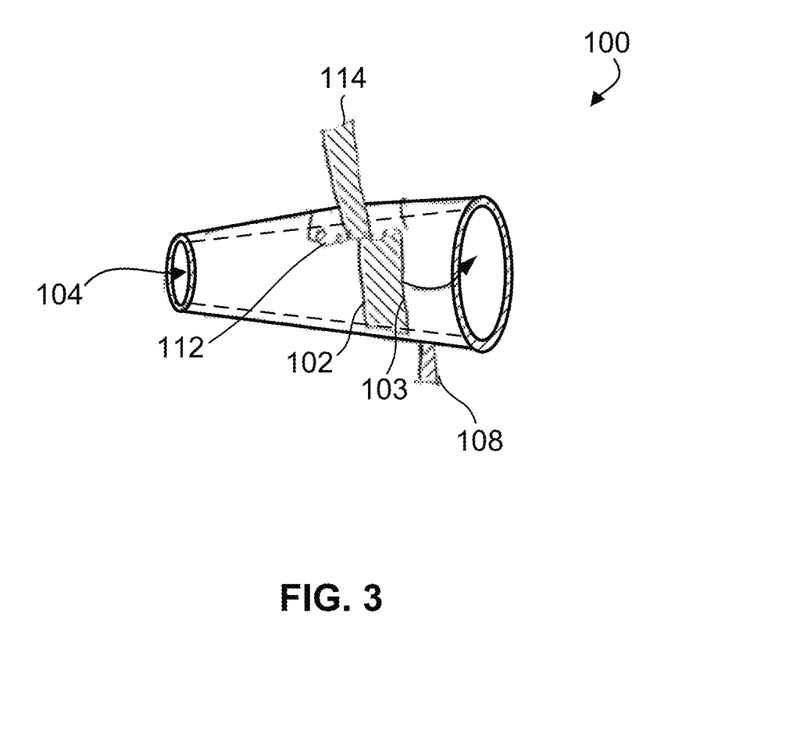
FIG. 3 is a side view of an example urinary catheter valve in a test position in accordance with some embodiments.

Referring to FIG. 3, the test position or configuration of the valve 100 is illustrated. The valve 100 is in the test position when the arm 108 is removed from the valve lumen 104 and is manually operated to open the valve gate 102.

The test position allows a user to test his/her ability to generate a bladder pressure to overcome the threshold pressure generated by the spring 112 and open the valve gate 102. In some embodiments, the threshold pressure is 30 cm of water column force. In some embodiments, the threshold pressure is from 15 to 45 cm of water column force, from 10 to 50 cm of water column force, from 20 to 40 cm of water column force, from 25 to 35 cm of water column force, and from 10 to 60 cm of water column force.

Valve 100 has three positions: Off (FIG. 1), Open (FIG. 2) and Test (FIG. 3). The valve 100 is placed into the Off position where the valve 100 is closed and the valve 100 is placed into or onto the end of a urinary catheter to function as an openable plug that prevents fluid flow out of the distal end of the urinary catheter. When the patient wishes to void, the patient can retract the arm 108 and pull the lever 114 back to open the spring-loaded one-way valve gate 102 to allow the patient empty their bladder through gravity.

The test setting shown in FIG. 3 utilizes a one-way valve with a threshold pressure set to approximately 30 cm of water column force, for example, via spring 112. The patient retracts the arm 108 out of contact with the valve gate 102 (as shown in FIG. 3) and then attempts to void through the catheter into the toilet/collection hat. If an ample bladder pressure is generated by the patient (i.e., at or above the threshold pressure), the urine pressure will cause the valve gate 102 to swing at least partially open and the urine will flow through/out the valve 100 and into the toilet/urine measuring collection device. Once the bladder pressure lowers below the threshold pressure, the trap door valve gate 102 closes and the patient can measure how much was voided. Next, the patient can pull lever 114 to open the valve gate 102 and see how much urine volume remained (referred to as the post void residual volume). A consistent ability to void through the valve 100, or a favorable ratio of voided volume through valve 100 versus retained volume through valve 100, will be predictive of voiding trial success.

Through utilization of different spring 112 tensions, a wide range of pressures for the bladder/urine to open the valve gate 102 can be implemented and tested. For example, the threshold pressure for women to urinate is less than the threshold pressure of men given differences in anatomy and urethral length. Accordingly, this disclosure describes a variety of valves (e.g., like the valve 100) with predetermined different cm of $H_2O$ column threshold pressure ratings (e.g., 30 cm of $H_2O$ to open, 60 cm of $H_2O$ to open, etc.). In some embodiments, a test kit in accordance with this disclosure can include multiple valves 100. Each of the valves 100 can have a spring 112 with a specific spring constant that differs from the springs 112 in the other valves 100 of the kit. For example, the valve can include a closed setting that has a single tension at a fixed estimated required bladder pressure. A set of various outflow valves can be provided with various fixed pressure requirements to open could be used as a test kit to test the patient's ability to void through the valves. In some embodiments, this disclosure provides an adjustable spring tension design where a ratchet approach can adjust tension to alter voiding pressure required to open (see e.g., FIG. 4).

Figure 4:
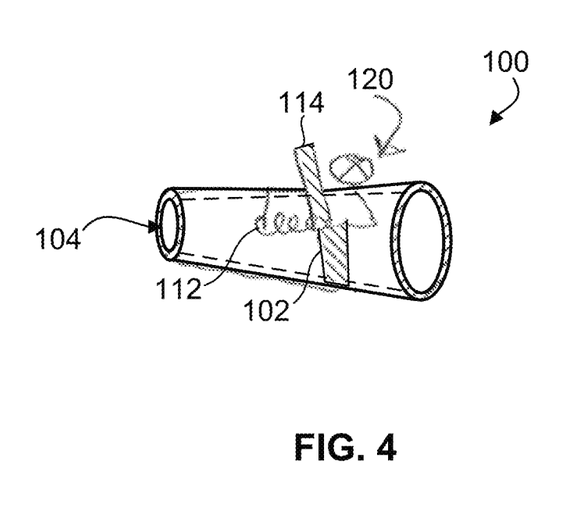
FIG. 4 shows another example urinary catheter valve in a closed position in accordance with some embodiments.

Referring to FIG. 4, in some embodiments, the tension of the outflow spring 112 is adjustable by manipulating the position of a screw 120, or similar mechanism, to get an estimate of generated bladder pressure. The screw 120 can be connected to the spring 112 and can include one or more threads around the screw 120 that can control the tension of the spring 112. The tension of the spring 112 can be adjusted by adjusting the screw 120 to test a variety of spring tensions. This facilitates the use of the valve 100 to test the user's ability to void at a variety of pressures.

Embodiments of this disclosure provide a three-way valve medical device (e.g., valve 100). The three way medical device (e.g., valve 100) can include a main body 106 configured to couple with a urinary catheter, the main body 106 defining a fluid flow path (e.g., valve lumen 104). The three way medical device (e.g., valve 100) can include a valve member (e.g. valve gate 102) that is movably coupled to the main body 106. The valve member is operable in: (i) a closed mode in which the fluid flow path is blocked by the valve member; (ii) an open mode in which the fluid flow path is unblocked by the valve member; and (iii) a test mode in which the fluid flow path is blocked by the valve member until a threshold fluid pressure is applied to the valve member.

This three-way medical device (e.g., valve 100) can be a valve (e.g., valve 100) that can be inserted into the end of urinary catheters. The three way medical device can include a flip/flow valve where the patient can have an indwelling urethral catheter in place and opt between off (bladder fills no urinary leakage), on (valve is open and is emptied into toilet), and a test position that is the third setting. The third setting of the three-way medical device valve described herein is a test position in which a one way trap door (e.g., valve gate 1-2) is aligned with the catheter opening (e.g. proximal end of valve lumen 104) (thus on/off/test settings). This trap door responds to a threshold pressure by swinging open to allow urine to escape through the catheter into the toilet. Accordingly, if the patient can achieve ample bladder pressure (i.e. the threshold pressure) to push open the valve gate and void their bladder into the toilet this will predict a likely successful voiding trial in which the patient can void without the catheter. The threshold pressure at which the valve can be opened may be variable and controlled by an adjustable setting (see e.g. FIG. 4) on the valve or via different valves with predetermined spring settings.

This device has clinical utility in various patients including patients present to the emergency room in total urinary retention, patients post prostate de-obstructing procedures (such as transurethral resection of the prostate "TURP" or similar procedures like photoselective vaporization of the prostate "pvp", holmium laser enucleation of the prostate "holep", rezum minimally invasive transurethral water vapour therapy for benign prostatic enlargement which uses thermal energy for treatment, urolift procedure implants to lift and hold the enlarged prostate tissue out of the way so it no longer blocks the urethra, etc.), and in patients recovering from stroke or spinal shock when bladder is flaccid etc.

Embodiments of this disclosure provide a method for testing a user's ability to urinate. The method includes inserting a urinary catheter system into a user, the urinary catheter system having a urinary catheter valve, the urinary catheter valve (e.g. valve 100 and/or three way medical device described above). The valve includes a valve gate (e.g., valve gate 102) configured to regulate fluid communication through a valve lumen (e.g., valve lumen 104), and an arm (e.g., arm 108) positioned distally from the valve gate. The arm 108 can extend into the valve lumen 104 and contact a distal face (e.g., distal face 103) of the valve gate 102 to prevent the valve gate 102 from actuating distally into an open position, and the arm 108 configured to be removed from the valve lumen to release the valve gate to actuate distally into the open position. The valve includes a spring (e.g., spring 112) connected to the valve gate; the spring can apply a threshold pressure against the valve gate to keep the valve gate in a closed position when the arm is removed from the valve lumen. The valve includes a lever (e.g., lever 114) connected to the valve gate configured to manually pull the valve gate into the open position when the arm is removed from the valve lumen.

The method includes removing the arm from the valve lumen, which allows the arm to actuate distally in response to an adequate pressure against the valve. The method includes generating a fluid pressure against a proximal face of the valve gate, and opening the valve gate to allow fluid communication through the valve lumen when the fluid pressure is above the threshold pressure. The method includes closing the valve gate to prevent fluid communication through the valve lumen when the fluid pressure is below the threshold pressure.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described herein should not be understood as requiring such separation in all embodiments, and it should be understood that the described program components and systems can generally be integrated together in a single product or packaged into multiple products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A urinary catheter system comprising:
    a catheter tube having a proximal insertion end and a distal end, the catheter tube defining a lumen extending from the proximal insertion end to the distal end for draining urine from a human bladder; and
    a valve connected to, or connectable to, the distal end of the catheter tube, the valve comprising:
        a valve housing defining a valve lumen therethrough;
        a valve gate coupled to the valve housing and configured to regulate fluid communication through the valve lumen;
        an arm movably coupled to the valve housing and positioned distally from the valve gate, the arm configured to extend into the valve lumen and to contact the valve gate to prevent the valve gate from actuating into an open position, and the arm configured to be removed to release the valve gate to allow the valve gate to move or be moved into the open position;
        a spring connected to the valve gate, the spring configured to apply a threshold pressure against the valve gate to keep the valve gate in a closed position when the arm is removed from the valve lumen, wherein when a fluid pressure above the threshold pressure will move the valve gate into or towards the open position to allow fluid flow through the valve lumen; and
        a lever connected to the valve gate and configured to be manually manipulated to move the valve gate into the open position when the arm is removed from the valve lumen.

2. The urinary catheter system of claim 1, wherein the valve is in a test position when the arm is removed from the valve lumen, the test position allows a user to test their ability to generate a bladder pressure to overcome the threshold pressure and open the valve gate.

3. The urinary catheter system of claim 1, wherein the threshold pressure is from 20 cm to 40 cm of water column force.

4. A urinary catheter valve comprising:
    a valve gate configured to regulate fluid communication through a valve lumen;
    an arm positioned distally from the valve gate, the arm configured to extend into the valve lumen and contact a distal face of the valve gate to prevent the valve gate from actuating distally into an open position, and the arm configured to be removed from the valve lumen to release the valve gate to actuate distally into the open position;
    a spring connected to the valve gate, the spring configured to apply a threshold pressure against the valve gate to keep the valve gate in a closed position when the arm is removed from the valve lumen, wherein a fluid pressure above the threshold pressure against the valve gate is configured to overcome the threshold pressure and actuate the valve gate into the open position; and
    a lever connected to the valve gate configured to manually pull the valve gate into the open position when the arm is removed from the valve lumen.

5. The urinary catheter valve of claim 4, wherein the valve is in a test position when the arm is removed from the valve lumen, the test position allows a user to test their ability to generate a bladder pressure to overcome the threshold pressure and open the valve gate.

6. The urinary catheter valve of claim 4, wherein the threshold pressure is 30 cm of water column force.

7. A method for testing a user's ability to urinate, the method comprising:
    inserting a urinary catheter system into a user, the urinary catheter system having a urinary catheter valve, the urinary catheter valve comprising:
        a valve gate configured to regulate fluid communication through a valve lumen;
        an arm positioned distally from the valve gate, the arm configured to extend into the valve lumen and contact a distal face of the valve gate to prevent the valve gate from actuating distally into an open position, and the arm configured to be removed from the valve lumen to release the valve gate to actuate distally into the open position;

a spring connected to the valve gate, the spring configured to apply a threshold pressure against the valve gate to keep the valve gate in a closed position when the arm is removed from the valve lumen; and a lever connected to the valve gate configured to manually pull the valve gate into the open position when the arm is removed from the valve lumen;

removing the arm from the valve lumen;

generating a fluid pressure against a proximal face of the valve gate;

opening the valve gate to allow fluid communication through the valve lumen when the fluid pressure is above the threshold pressure; and closing the valve gate to prevent fluid communication through the valve lumen when the fluid pressure is below the threshold pressure.

\* \* \* \* \*